US012781078B2

(12) United States Patent
Iizuka et al.

(10) Patent No.: US 12,781,078 B2
(45) Date of Patent: Nov. 3, 2026

(54) INKJET INK AND METHOD FOR PRODUCING CURED FILM

(71) Applicant: Konica Minolta, Inc., Tokyo (JP)

(72) Inventors: Momoko Iizuka, Tokyo (JP); Takeo Oshiba, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 155 days.

(21) Appl. No.: 18/737,130

(22) Filed: Jun. 7, 2024

(65) Prior Publication Data

US 2024/0417580 A1 Dec. 19, 2024

(30) Foreign Application Priority Data

Jun. 15, 2023 (JP) ................................ 2023-098229

(51) Int. Cl.

| | |
|---|---|
| ***C09D 11/38*** | (2014.01) |
| ***B41M 7/00*** | (2006.01) |
| ***C09D 11/101*** | (2014.01) |
| ***C09D 11/107*** | (2014.01) |

(52) U.S. Cl.

CPC .......... *C09D 11/38* (2013.01); *B41M 7/0081* (2013.01); *C09D 11/101* (2013.01); *C09D 11/107* (2013.01)

(58) Field of Classification Search

CPC ..... C09D 11/38; C09D 11/101; C09D 11/107; B41M 7/0081

See application file for complete search history.

(56) References Cited

U.S. PATENT DOCUMENTS

2018/0371276 A1* 12/2018 Miyano ................ C09D 11/033

FOREIGN PATENT DOCUMENTS

| | | | | |
|---|---|---|---|---|
| JP | 2022-007965 A | 1/2022 | | |
| WO | WO-2022030261 A1 * | 2/2022 | .......... | C09D 11/322 |
| WO | WO-2022085246 A1 * | 4/2022 | .......... | C09D 11/101 |

OTHER PUBLICATIONS

Aoki et al., "Ink Composition For Photocurable Inkjet Printing" (WO 2022/085246 A1), Apr. 2, 20228, [Abstract] (Year: 2022).*

Nakashima et al., "Ink Composition for Photocurable Inkjet Printing" (WO 2022030261 A1), Feb. 10, 2022, [Abstract and Description of Embodiments: Requirement C]. (Year: 2022).*

* cited by examiner

*Primary Examiner* — Lisa Solomon

(74) *Attorney, Agent, or Firm* — LUCAS & MERCANTI, LLP

(57) ABSTRACT

To provide inkjet ink which contains an amine-modified polymerizable compound and can form a cured film having both characteristics of high abrasion resistance and high folding crack resistance. An actinic radiation-curable inkjet ink provided herein contains a polymerizable compound (A) that polymerizes upon irradiation with actinic radiation, a photopolymerization initiator (B), and a gelling agent (C). The polymerizable compound (A) contains an amine-modified polymerizable compound (A1), and the photopolymerization initiator (B) contains ethoxy(2,4,6-trimethylbenzoyl) phenylphosphine oxide.

9 Claims, No Drawings

INKJET INK AND METHOD FOR PRODUCING CURED FILM

CROSS REFERENCE TO RELATED APPLICATIONS

The entire disclosure of Japanese Patent Application No. 2023-098229 filed on Jun. 15, 2023, is incorporated herein by reference in its entirety.

BACKGROUND

Technological Field

The present invention relates to an inkjet ink and a method for producing a cured film.

Description of Related Art

An actinic radiation-curable inkjet ink is known. Such an actinic radiation-curable inkjet ink is cured by irradiation with actinic radiation such as ultraviolet rays or electron beams after the ink is applied onto a base material, thereby forming a cured film or the like. The actinic radiation-curable inkjet ink usually contains a polymerizable compound that is polymerized by irradiation with actinic radiation, and a photopolymerization initiator for initiating the polymerization of the polymerizable compound.

Japanese Unexamined Patent Publication No. 2022-007965 describes a photocurable inkjet ink containing an amine-modified oligomer as a polymerizable compound. According to Japanese Unexamined Patent Publication No. 2022-007965, the amount of the amine-modified oligomer is 0.5% by mass or more in the inkjet ink, and the types and amounts of the other polymerizable compound and the photopolymerization initiator are appropriately selected. It is described that thus, the surface curability of the ink is improved, and a coating film (cured film) excellent in tackiness and abrasion resistance is obtained.

As described in Japanese Unexamined Patent Publication No. 2022-007965, an amine-modified polymerizable compound such as an amine-modified oligomer has the effect of increasing the curability of an inkjet ink. The reason for this is believed to be that since the amine-modified polymerizable compound has both an amino group and a polymerizable group in the molecule thereof, hydrogen abstraction by the amino group and a subsequent chain transfer reaction are likely to occur. The amine-modified polymerizable compound probably has high reactivity due to the above-described characteristics. The amine-modified polymerizable compound thus has a high crosslinking density and a high hardness, and therefore a cured film having a high abrasion resistance is easily formed.

On the other hand, when the hardness of the cured film increases, the flexibility decreases. Therefore, a cured film having a high hardness tends to be cracked when the base material is folded (tends to have low folding crack resistance).

SUMMARY

The present invention has been made in consideration of the above-described circumstances, and the object thereof is to provide an actinic radiation-curable inkjet ink containing an amine-modified polymerizable compound, the inkjet ink being capable of forming a cured film having characteristics of both high abrasion resistance and high folding crack resistance, and a method for producing a cured film using the inkjet ink.

To achieve at least one of the above-mentioned objects, an actinic radiation-curable inkjet ink reflecting one aspect of the present invention contains a polymerizable compound (A) that polymerizes upon irradiation with actinic radiation; a photopolymerization initiator (B); and a gelling agent (C), wherein the polymerizable compound (A) contains an amine-modified polymerizable compound (A1), and the photopolymerization initiator (B) contains ethoxy(2,4,6-(trimethylbenzoyl)phenylphosphine oxide.

The advantageous and features provided by one or more embodiments of the invention will become more fully understood from the detailed description given hereinbelow.

DETAILED DESCRIPTION OF EMBODIMENTS

Hereinafter, one or more embodiments of the present invention will be described. However, the scope of the invention is not limited to the disclosed embodiments.

1. Inkjet Ink

An embodiment of the present invention relates to an actinic radiation-curable inkjet ink (hereinafter, also simply referred to as "inkjet ink") including a polymerizable compound (A) that is polymerized by irradiation with actinic radiation, a photopolymerization initiator (B), and a gelling agent (C).

Examples of active energy rays that can be used for curing the inkjet ink include electron beams, ultraviolet rays, α-rays, γ-rays, and X-rays. Among these, ultraviolet rays and electron beams are preferable, and ultraviolet rays are more preferable.

Components that the inkjet ink may contain, physical properties of the inkjet ink, and the like are described below.

1-1. Components 1-1-1. Polymerizable Compound (A)

The polymerizable compound (A) may be either a radically polymerizable compound or a cationically polymerizable compound. Among these, radically polymerizable compounds are preferable.

The radically polymerizable compound is a polymerizable compound having a radically polymerizable ethylenically unsaturated bond in the molecule thereof. Examples of the cationically polymerizable compound include epoxy compounds, vinyl ether compounds, and oxetane compounds.

The content of the polymerizable compound (A) may be 1% by mass or more and 97% by mass or less based on the total mass of the inkjet ink. The content is preferably 30% by mass or more and 95% by mass or less. The content is more preferably 50% by mass or more and 90% by mass or less. The content is even more preferably 70% by mass or more and 90% by mass or less.

1-1-1-1. Amine-Modified Polymerizable Compound (A1)

The polymerizable compound (A) includes an amine-modified polymerizable compound (A1). Examples of the amine-modified polymerizable compound (A1) include amine-modified oligomers, reactive amine co-initiators, reactive amine synergists, acrylate-modified amine synergists, amine acrylates, and amino acrylates. The amine-modified polymerizable compound (A1) is preferably an amine-modified oligomer. The amine-modified oligomer is a dimer, trimer or higher compound containing an amino group and a polymerizable group in the molecule thereof. The amine-modified polymerizable compound may be an alkylene oxide-modified compound, such as an ethylene oxide-modified compound or a propylene oxide-modified compound, or may be a compound that is not alkylene oxide-modified.

The molecular weight of the amine-modified polymerizable compound is not particularly limited, but is preferably 300 or more and 3000 or less, more preferably 400 or more and 2000 or less.

The type of the polymerizable group included in the amine-modified polymerizable compound is not particularly limited, and may be a radically polymerizable functional group or a cationically polymerizable functional group. From the viewpoint of increasing curability by hydrogen abstraction of an amino group and obtaining a cured film having high abrasion resistance, a radically polymerizable functional group is preferable. Examples of the radically polymerizable functional group include vinyl group, allyl group, (meth)acryloyl group, (meth)acrylamide group, vinyl ether group, and allyl ether group.

Note that in the present specification, the term "(meth) acrylic" means acrylic or methacrylic. The term "(meth) acrylate" means acrylate or methacrylate. The term "(meth) acryloyl" means acryloyl or methacryloyl. "(Meth) acrylamide" means acrylamide or methacrylamide.

The number of polymerizable groups that the amine-modified polymerizable compound has in the molecule is not particularly limited, but is preferably two or more from the viewpoint of increasing the hardness of the cured film to enhance the abrasion resistance. As the number of polymerizable groups increases, the crosslink density can be increased to enhance the abrasion resistance of the cured film, and the amount of unreacted polymerizable compound (A) can be reduced to suppress peeling of the cured film at the cut surface. In addition, migration or blooming of an unreacted polymerizable compound or an unreacted or reacted photopolymerization initiator from the cured film can be suppressed. When the number of the polymerizable groups is appropriately small, it is possible to suppress a decrease in ejection properties from an ink jet head due to an increase in the molecular weight of the amine-modified polymerizable compound.

The content of the amine-modified polymerizable compound (A1) is preferably more than 0% by mass and 20% by mass or less based on the total mass of the inkjet ink. The content is more preferably 0.01% by mass or more and 8% by mass or less. The content is even more preferably 0.01% by mass or more and 2% by mass or less. As the content of the amine-modified polymerizable compound (A1) is greater, the abrasion resistance of a cured film can be enhanced and the peeling of a cured film at a cut surface can be suppressed. In addition, migration or blooming of an unreacted polymerizable compound or an unreacted or reacted photopolymerization initiator from the cured film can be suppressed. As the content of the amine-modified polymerizable compound (A1) becomes smaller, folding cracks can be made less likely to occur. In addition, when the content of the amine-modified polymerizable compound (A1) is excessive, the reaction of other polymerizable compounds may be inhibited by the amine-modified polymerizable compound (A1). However, by setting the content of the amine-modified polymerizable compound (A1) in an appropriate range, it is possible to suppress the occurrence of folding cracks due to the loss of flexibility of the cured film due to an increase in the number of crosslinking points. In addition, migration or blooming of the unreacted polymerizable compound caused by the reaction inhibition can be suppressed.

1-1-1-2. Other Polymerizable Compounds (A2)

The polymerizable compound (A) may include another polymerizable compound (A2) other than the amine-modified polymerizable compound (A1).

The other polymerizable compound (A2) may be a radically polymerizable compound or a cationically polymerizable compound, but is preferably a radically polymerizable compound.

Examples of the radically polymerizable compound (A2) include unsaturated carboxylic acids and salts thereof, unsaturated carboxylic acid ester compounds, and unsaturated carboxylic acid urethane compounds. Unsaturated carboxylic acid amide compounds and anhydrides thereof are also included. The examples also include acrylonitrile, styrene, unsaturated polyesters, unsaturated polyethers, unsaturated polyamides, unsaturated urethanes. Examples of the unsaturated carboxylic acid include (meth)acrylic acid, itaconic acid, crotonic acid, isocrotonic acid, and maleic acid. Among these, unsaturated carboxylic acid esters such as (meth)acrylate are preferable; and (meth)acrylate is more preferable.

Examples of the monofunctional (meth)acrylate include isoamyl (meth)acrylate, stearyl (meth)acrylate, isobornyl (meth)acrylate, lauryl (meth)acrylate, octyl (meth)acrylate, decyl (meth)acrylate, isomyristyl (meth)acrylate, isostearyl (meth)acrylate, 2-phenoxyethyl (meth)acrylate, 2-ethylhexyl-diglycol (meth)acrylate, 2-hydroxybutyl (meth)acrylate, 2-(meth)acryloyloxyethylhexahydrophthalic acid, butoxyethyl (meth)acrylate, ethoxydiethylene glycol (meth) acrylate, methoxydiethylene glycol (meth)acrylate, methoxypolyethylene glycol (meth)acrylate, methoxypropylene glycol (meth)acrylate, o-phenylphenoxyethyl (meth) acrylate, m-phenoxybenzyl (meth)acrylate, cyclic trimethylolpropane formal (meth)acrylate, ethoxylated phenoxy (meth)acrylate, alkoxylated phenol (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 2-hydroxy-o-phenylphenolpropyl (meth)acrylate, 2-(meth)acryloyloxyethylsuccinic acid, 2-(meth)acryloyloxyethylphthalic acid, 2-(meth)acryloyloxyethyl-2-hydroxyethyl-phthalic acid and t-butylcyclohexyl (meth)acrylate.

Examples of the polyfunctional (meth)acrylate include bifunctional (meth)acrylates including triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth) acrylate, tricyclodecanedimethanol diacrylate, dimethyloltricyclodecane di(meth)acrylate, bisphenol A-type di(meth) acrylate, neopentyl glycol hydroxypivalate di(meth) acrylate, polytetramethylene glycol di(meth)acrylate, polyethylene glycol diacrylate, dipropylene glycol diacrylate, and tripropylene glycol diacrylate. Examples of the polyfunctional (meth)acrylate also include three or more functional (meth)acrylates including trimethylolpropane tri (meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerolpropoxy tri(meth)acrylate, and pentaerythritol ethoxy tetra(meth)acrylate.

Examples of the cationically polymerizable compound (A2) include epoxy compounds, vinyl ether compounds, and oxetane compounds.

Examples of the epoxy compound include cycloaliphatic epoxy resins such as 3,4-epoxycyclohexylmethyl-3',4'-epoxycyclohexanecarboxylate, bis(3,4-epoxycyclohexylmethyl) adipate, vinylcyclohexene monoepoxide, ε-caprolactone-modified 3,4-epoxycyclohexylmethyl 3',4'-epoxycyclohexanecarboxylate, 1-methyl-4-(2-methyloxiranyl)-7-oxabicyclo[4,1,0] heptane, 2-(3,4-epoxycyclohexyl-5,5-spiro-3,4-epoxy)cyclohexanone-meta-dioxane, and bis(2,3-epoxycyclopentyl) ether. Examples of the epoxy compound also include aliphatic epoxy compounds including diglycidyl ether of 1,4-butanediol, diglycidyl ether of 1,6-hexanediol, triglycidyl ether of glycerin, triglycidyl ether of trimethylolpropane, diglycidyl ether of polyethylene glycol, diglycidyl ether of propyleneglycol, polyglycidyl ethers of polyetherpolyols obtained by adding one or more alkylene oxides (ethylene oxides, propylene oxides, and the like) to aliphatic polyhydric alcohols such as ethylene glycol, propylene glycol, and glycerin. Examples of the epoxy compound also include a di- or polyglycidyl ether of bisphenol A or an alkylene oxide adduct thereof, a di- or polyglycidyl ether of hydrogenated bisphenol A or an alkylene oxide adduct thereof, and an aromatic epoxy compound including a novolac-type epoxy resin.

Examples of the vinyl ether compound include monovinyl ether compounds such as ethyl vinyl ether, N-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, N-propyl vinyl ether, isopropyl vinyl ether, isopropenyl ether-o-propylene carbonate, dodecyl vinyl ether, diethylene glycol monovinyl ether, and octadecyl vinyl ether. Examples of the vinyl ether compound also include di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether.

Examples of the oxetane compound include 3-hydroxymethyl-3-methyloxetane, 3-hydroxymethyl-3-ethyloxetane, 3-hydroxymethyl-3-propyloxetane, 3-hydroxymethyl-3-n-butyloxetane, 3-hydroxymethyl-3-phenyloxetane, 3-hydroxymethyl-3-benzyloxetane, 3-hydroxyethyl-3-methyloxetane, 3-hydroxyethyl-3-ethyloxetane, 3-hydroxyethyl-3-propyloxetane, 3-hydroxyethyl-3-phenyloxetane, 3-hydroxypropyl-3-methyloxetane, 3-hydroxypropyl-3-ethyloxetane, 3-hydroxypropyl-3-propyloxetane, 3-hydroxypropyl-3-phenyloxetane, 3-hydroxybutyl-3-methyloxetane, 1,4-bis{[(3-ethyl-3-oxetanyl) methoxy] methyl} benzene, 3-ethyl-3-(2-ethylhexyloxymethyl) oxetane, and di[1-ethyl (3-oxetanyl)] methyl ether.

1-1-2. Photopolymerization Initiator (B)

The photopolymerization initiator (B) is a compound that initiates polymerization and crosslinking of the actinic radiation-polymerizable compound by irradiation.

In the present embodiment, the photopolymerization initiator (B) (hereinafter, also simply referred to as "initiator (B1)") contains ethoxy(2,4,6-trimethylbenzoyl)phenylphosphine oxide. Although the reason is not clear, since the initiator (B1) has a moderate curing rate, it is possible to suppress excessive polymerization of the polymerizable compound (A). Furthermore, in the present embodiment, the movement of the polymerizable compound (A) is limited by a so-called card house structure formed by the gelling agent (C), and excessive chain movement of the polymerizable compound (A) is further suppressed. It is considered that the folding crack resistance of the cured film is enhanced by these actions.

The content of the initiator (B1) is preferably 0.5% by mass or more and 10% by mass or less based on the total mass of the inkjet ink. The content is more preferably 1% by mass or more and 8% by mass or less. The content is more preferably 2% by mass or more and 8% by mass or less. The content is even more preferably 2% by mass or more and 5% by mass or less.

The ratio (A1/B1) of the content of the amine-modified polymerizable compound (A1) to the content of the photopolymerization initiator (B1) is preferably more than 0 and 8 or less. The ratio is more preferably more than 0 and 5 or less. The ratio is even more preferably more than 0 and 2 or less. The ratio is further more preferably 0.05 or more and 1.5 or less. The ratio is particularly preferably 0.1 or more and 1 or less. As the ratio (A1/B1) becomes larger, the abrasion resistance of the cured film tends to increase due to the action of the amine-modified polymerizable compound (A1). In addition, as the ratio (A1/B1) becomes larger, the amount of the unreacted polymerizable compound (A) can be reduced by a chain transfer reaction to suppress the peeling of the cured film at the cut surface. As the ratio (A1/B1) becomes smaller, the amine-modified polymerizable compound (A1) can be more sufficiently reacted. Thus, peeling of the cut surface, migration, and blooming caused by the unreacted polymerizable compound (A) can be suppressed. In addition, a change in the gloss of the image due to this can be suppressed. In addition, it is possible to suppress a decrease in folding crack resistance due to brittleness of the cured film caused by an insufficient reaction, a decrease in abrasion resistance due to insufficient curing on the surface of the cured film, and the like.

The photopolymerization initiator (B) may further include bis(2,4,6-(trimethylbenzoyl)phenylphosphine oxide or diphenyl(2,4,6-(trimethylbenzoyl)phenylphosphine oxide (hereinafter, these may be collectively referred to as "initiator (B2)"). These photopolymerization initiators, when used in combination with the initiator (B1), efficiently polymerize the polymerizable compound (A), improve the surface curability of a cured film, and suppress peeling of a cured film at a cut surface.

The content of the initiator (B2) is preferably 0% by mass to 8% by mass, more preferably 1% by mass to 8% by mass, and even more preferably 2% by mass to 8% by mass based on the total mass of the ink jet ink.

The photopolymerization initiator (B) may contain another photopolymerization initiator (B3) (hereinafter, also simply referred to as "initiator (B3)") other than the initiator (B1) or the initiator (B2).

The initiator (B3) may bean intramolecular bond cleavage type polymerization initiator or an intramolecular hydrogen abstraction type polymerization initiator.

Examples of the intramolecular bond cleavage type radical polymerization initiator include acetophenone-based initiators such as diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl) ketone, 1-hydroxycyclohexyl-phenylketone, 2-methyl-2-morpholino (4-methylthiophenyl) propan-1-one and 2-benzyl-2-dimethylamino-1-(4-morpholinophenyl)-butanone, benzoin-based initiators such as benzoin, benzoin methyl ether and benzoin isopropyl ether, benzyl, methylphenyl glyoxy esters, and the like.

Examples of the intramolecular hydrogen abstraction type radical polymerization initiator include benzophenone-based initiators such as benzophenon, methyl o-benzoylbenzoate, 4-phenylbenzophenone, 4,4'-dichlorobenzophenone, hydroxybenzophenone, 4-benzoyl-4'-methyl-diphenyl sulfide, acrylated benzophenon, 3,3',4,4'-tetra (t-butylperoxycarbonyl) benzophenon, and 3,3'-dimethyl-4-methoxybenzophenone, thioxanthone-based initiators such as 2-isopropylthioxanthone, 2,4-dimethylthioxanthone, 2,4-diethylthioxanthone, and 2,4-dichlorothioxanthone, aminobenzophenone-based initiators such as Michler's ketone and 4,4'-diethylaminobenzophenone, 10-butyl-2-chloroacridone, 2-ethylanthraquinone, 9,10-phenanthrenequinone, and camphorquinone.

When the polymerizable compound (A) includes a cationically polymerizable compound, the initiator (B3) may include a cationic polymerization initiator. Examples of the cationic polymerization initiator include photoacid generators. Examples of the photoacid generator include diazonium, ammonium, iodonium, and sulfonium. Also included are $B(C_6F_5)_4$—, $PF_6$, $AsF_6$—, $SbF_6$—, and $CF_3SO_3$— salts of aromatic onium compounds including phosphonium or the like, sulfonated products that generate sulfonic acid, halides that photogenerate hydrogen halide, and iron-allene complexes.

The content of the photopolymerization initiator (B) is preferably 1.5% by mass or more and 12% by mass or less, more preferably 3% by mass or more and 10% by mass or less, and even more preferably 5% by mass or more and 8% by mass or less, based on the total mass of the inkjet ink. As the content of the photopolymerization initiator (B) increases, the curability of the inkjet ink can be further enhanced. When the content of the photopolymerization initiator (B) is appropriately small, migration or blooming of the unreacted or reacted photopolymerization initiator from the cured film can be suppressed.

The ratio (A1/B) of the content of the amine-modified polymerizable compound (A1) to the content of the photopolymerization initiator (B) is preferably more than 0 and 8 or less. The ratio is more preferably more than 0 and 5 or less. The ratio is even more preferably more than 0 and 2 or less. The ratio is further more preferably 0.05 or more and 1.5 or less. The ratio is particularly preferably 0.1 or more and 1 or less. As the ratio (A1/B) becomes larger, the abrasion resistance of the cured film is easily enhanced by the action of the amine-modified polymerizable compound (A1). In addition, as the ratio (A1/B) becomes larger, the amount of the unreacted polymerizable compound (A) can be reduced by a chain transfer reaction to suppress the peeling of the cured film at the cut surface. As the ratio (A1/B) becomes smaller, the amine-modified polymerizable compound (A1) can be more sufficiently reacted to suppress the peeling and migration at the cut surface and blooming due to the unreacted polymerizable compound (A). A change in the gloss of the image due to this can be suppressed. It is possible to suppress a decrease in folding crack resistance due to brittleness of the cured film caused by an insufficient reaction, a decrease in abrasion resistance due to insufficient curing on the surface of the cured film, and the like.

1-1-3. Gelling Agent (C)

The gelling agent (C) is a compound that causes the inkjet ink to be in a gel state at room temperature and causes the inkjet ink to be in a flowable state when heated. The gelling agent (C) can gel the inkjet ink applied to a base material at an early stage and enhance the pinning property of the inkjet ink.

The gelling agent (C) is preferably a compound that dissolves in the actinic radiation-polymerizable compound contained in the ink at a temperature higher than the gelation temperature of the inkjet ink, and crystallizes in the ink at a temperature equal to or lower than the gelation temperature of the ink. The term "gelation temperature" refers to a temperature at which, when an inkjet ink having been turned into a sol or liquid by heating is cooled, the ink undergoes a phase transition from the sol to a gel, and the viscosity of the ink suddenly changes. Specifically, when the ink having been turned into a sol or liquid is cooled while the viscosity thereof is measured by a rheometer (for example, MCR300 manufactured by Anton Paar), the temperature at which the viscosity rapidly increases can be defined as the gelation temperature of the ink.

The gelling agent (C) is preferably crystallized in the ink at a temperature equal to or lower than the gelation temperature of the inkjet ink to form a structure in which the polymerizable compound (A) is enclosed in a three dimensional space formed by the gelling agent (C) crystallized in plate shapes. Such a structure is hereinafter referred to as a "card house structure". When the card house structure is formed, a range in which the amine-modified polymerizable compound (A1) can move is also limited to the inside of the three dimensional space. Therefore, the reaction between the amine-modified polymerizable compound (A1) contained in a certain space and the amine-modified polymerizable compound (A1) contained in another space is suppressed, and the chain transfer reaction by the amine-modified polymerizable compound (A1) also occurs only within a predetermined range. Accordingly, it is considered that the formation of excessive crosslinking is suppressed, and the resulting cured film is not excessively cured, and therefore, the cured film is flexible to some extent and is not easily broken even when the cured film is folded.

Examples of the gelling agent (C) that tends to form a card house structure include aliphatic ketones, aliphatic esters, petroleum-based waxes, plant-based waxes, and animal-based waxes. Mineral waxes, hydrogenated castor oil, modified waxes, higher fatty acids, higher alcohols, and hydroxystearic acid are also included. Included are fatty acid amides, including N-substituted fatty acid amides and special fatty acid amides, and higher amines. Included are esters of sucrose fatty acids, synthetic waxes, dibenzylidene sorbitol, dimer acids and dimer diols.

Examples of the aliphatic ketone include dilignoceryl ketone, dibehenyl ketone, distearyl ketone, dieicosyl ketone, dipalmityl ketone, dilauryl ketone, dimyristyl ketone, myristyl palmityl ketone, and palmityl stearyl ketone.

Examples of the aliphatic ester include fatty acid esters of monoalcohols such as behenyl behenate, icosyl icosanoate, stearyl stearate, palmityl stearate, myristyl myristate, cetyl myristate, and oleyl palmitate. Also included are fatty acid esters of polyhydric alcohols such as glycerin fatty acid esters, sorbitan fatty acid esters, propylene glycol fatty acid esters, ethylene glycol fatty acid esters, and polyoxyethylene fatty acid esters.

Examples of commercially available products of the aliphatic ester include EMALEX series, Rikemar series, and Poem series.

Examples of the higher fatty acid include behenic acid, arachidic acid, stearic acid, palmitic acid, myristic acid, lauric acid, oleic acid, and erucic acid.

Examples of the higher alcohol include stearyl alcohol and behenyl alcohol.

Among these, from the viewpoint of more sufficiently obtaining the effect of improving the folding crack resistance due to the card house structure, the gelling agent (C) is preferably an aliphatic ketone, an aliphatic ester, a higher fatty acid, or a higher alcohol. The aliphatic ketone is more preferably an aliphatic ketone represented by the General formula (G1) or an aliphatic ester represented by the General formula (G2) below. The gelling agent (C) may be contained singly or in combination of two or more types thereof.

$$R_a—CO—R_b \qquad \text{General formula (G1)}$$

$$R_c—COO—R_d \qquad \text{General formula (G2)}$$

In General formula (G1), $R_a$ and $R_b$ each independently represent a linear hydrocarbon group which has 12 or more and 26 or less carbon atoms and may have a branched chain. In general formula (G2), $R_c$ and $R_d$ each independently represent a linear hydrocarbon group which has 12 or more and 26 or less carbon atoms and may have a branched chain.

The gelling agents (C) represented by General formulae (G1) and (G2) have high crystallinity since the number of carbon atoms of $R_a$ to $R_d$ is 12 or more, and generates a sufficiently wide space inside the card house structure. Therefore, the effect of improving the folding crack resistance due to inclusion of the polymerizable compound (A) is more sufficiently exhibited.

In addition, in the gelling agents (C) represented by General formulae (G1) or (G2), since the number of carbon atoms of $R_a$ to $R_d$ is 26 or less, the melting temperature is appropriately low, and the solation temperature of the inkjet ink is not excessively increased. Therefore, it is possible to lower the heating temperature of the inkjet ink at the time of ejection.

Examples of the aliphatic ketone represented by General formula (G1) include dilignoceryl ketone (carbon numbers: 23-24), dibehenyl ketone (carbon numbers: 21-22), distearyl ketone (carbon numbers: 17-18), dieicosyl ketone (carbon numbers: 19-20), dipalmityl ketone (carbon numbers: 15-16), dimyristyl ketone (carbon numbers: 13-14), dilauryl ketone (carbon numbers: 11-12), lauryl myristyl ketone (carbon numbers: 11-14), lauryl palmityl ketone (carbon numbers: 11-16), myristyl palmityl ketone (carbon numbers: 13-16), myristyl stearyl ketone (carbon numbers: 13-18), myristyl behenyl ketone (carbon numbers: 13-22), palmityl stearyl ketone (carbon numbers: 15-18), palmityl behenyl ketone (carbon numbers: 15-22) and stearyl behenyl ketone (carbon numbers: 17-22). The number of carbon atoms in the above parentheses represents the number of carbon atoms of each of two hydrocarbon groups separated by a carbonyl group.

Examples of commercially available products of the compound represented by General formula (G1) include 18-Pentatriacontanon and Hentriacontan-16-on (all manufactured by Alfa Aeser), and KAO WAX T1 (manufactured by Kao Corporation).

Examples of the aliphatic ester represented by General formula (G2) include behenyl behenate (carbon numbers: 21-22), icosyl icosanoate (carbon numbers: 19-20), stearyl stearate (carbon numbers: 17-18), palmityl stearate (carbon numbers: 17-16), lauryl stearate (carbon numbers: 17-12), cetyl palmitate (carbon atoms: 15-16), stearyl palmitate (carbon numbers: 15-18), myristyl myristate (number of carbons: 13-14), cetyl myristate (carbon numbers: 13-16), octyldodecyl myristate (carbon numbers: 13-20), stearyl oleate (carbon numbers: 17-18), stearyl erucate (carbon numbers: 21-18), stearyl linoleate (carbon numbers: 17-18), behenyl oleate (carbon numbers: 18-22), and arachidyl linoleate (carbon numbers: 17-20). The number of carbon atoms in the above parentheses represents the number of carbon atoms of each of the two hydrocarbon groups separated by the ester group.

Examples of commercially available products of the aliphatic ester represented by the general formula (G2) include Unister M-2222SL, SPERMACETI, Nissan Electol WEP-2 and Nissan Electol WEP-3 (all manufactured by NOF Corporation, "Unister" and "Nissan Electol" are registered trademarks of the same company), EXCEPARL SS and EXCEPARL MY-M (all manufactured by Kao Corporation, "EXCEPARL" is a registered trademark of the same company), Emalex CC-18 and Emalex CC-10 (manufactured by Nippon Emulsion Co., Ltd., "Emalex" is a registered trademark of the same company), and AMREPS PC (manufactured by Higher Alcohol Industries Co., Ltd., "AMREPS" is a registered trademark of the same company). These commercially available products are often mixtures of two or more types, and therefore, may be separated and purified as necessary to be contained in an ink.

The content of the gelling agent (C) is preferably 0.5% by mass or more and 10% by mass or less, more preferably 0.5% by mass or more and 8% by mass or less, and even more preferably 1% by mass or more and 6% by mass or less, based on the total mass of the ink. As the content of the gelling agent (C) increases, the density of crosslinking formed by the amine-modified polymerizable compound (A1) can be suppressed, and the folding crack resistance and abrasion resistance of the cured film can be enhanced. Furthermore, the card house structures can contain an unreacted polymerizable compound (A), photopolymerization initiator (B), and the like to prevent blooming of them, thereby preventing a change in the gloss of the image.

1-14. Other Components

The inkjet ink may further contain other components such as a colorant, a dispersant, a surfactant, a polymerization inhibitor, and a humectant.

1-1-4-1. Colorant

The colorant may be a dye or a pigment, and is preferably a pigment from the viewpoint of forming a cured film having high weather resistance. The pigments may be selected from yellow pigment, red pigment, blue pigment, black pigment and white pigment depending on a cured film to be formed and a color or the like of an image or the like formed by aggregation of the cured film.

Examples of yellow pigments include Pigment Yellow (PY) 1, 3, 12, 13, 14, 17, 34, 35, 37, 55, 74, 81, 83, and 93. Examples of the yellow pigment also include Pigment Yellow (PY) 94, 95, 97, 108, 109, 110, 137, 138, 139, 153, 154, 155, 157, 166, 167, 168, 180, 185, 193, and the like.

Examples of red pigments include Pigment Red (PR) 3, 5, 19, 22, 31, 38, 43, 48:1, 48:2, 48:3, 48:4, 48:5, 49:1, and 53:1. Examples of red pigments also include Pigment Red (PR) 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257. Examples of red pigments also include Pigment Violet (PV) 3, 19, 23, 29, 30, 37, 50, and 88, and Pigment Orange (PO) 13, 16, 20, and 36.

Examples of blue pigments include Pigment Blue (PB) 1, 15, 15:1, 15:2, 15:3, 15:4, 15:6, 16, 17:1, 22, 27, 28, 29, 36, 60, and the like.

Examples of green pigments include C. I. Pigment Green (hereinafter also simply referred to as "PG") 7, PG26, PG36, and PG50.

Examples of black pigments include C. I. Pigment Black (hereinafter also simply referred to as "PBk") 7, PBk26, and PBk28.

Examples of the white pigment include inorganic pigments such as titanium oxide, zinc oxide, calcium carbonate, barium sulfate, and aluminum hydroxide. Of these, titanium oxide is preferable, and anatase type titanium oxide is preferable from the viewpoint of reducing the particle size of the white pigment, and rutile type titanium oxide is preferable from the viewpoint of enhancing the concealing properties of an image.

The content of the colorant is preferably 0.1% by mass or more and 10% by mass or less, more preferably 1% by mass or more and 5% by mass or less, based on the total mass of the inkjet ink.

1-1-4-2. Dispersant

The dispersibility of the colorant that is a pigment may be enhanced by a dispersant.

Examples of the dispersant include carboxylic acid esters having a hydroxy group, salts of long-chain polyaminoamides and high-molecular-weight acid esters, and salts of high-molecular-weight polycarboxylic acids. The examples also include salts of long-chain polyaminoamides and polar acid esters, high-molecular-weight unsaturated acid esters, high-molecular-weight copolymers, and modified polyurethanes. The examples also include modified polyacrylates, polyether ester type anionic surfactants, naphthalenesulfonic acid-formalin condensate salts, and aromatic sulfonic acid-formalin condensate salts. The examples also include polyoxyethylene alkyl phosphate esters, polyoxyethylene nonylphenyl ether, stearylamine acetate, and the like.

The content of the dispersant is preferably 1% by mass or more and 50% by mass or less relative to the mass of the pigment.

1-1-4-3. Surfactant

Examples of the surfactant include anionic surfactants such as dialkylsulfosuccinates, alkylnaphthalenesulfonates, and fatty acid salts. The examples also include nonionic surfactants such as polyoxyethylene alkyl ethers, polyoxyethylene alkyl allyl ethers, acetylene glycols, and polyoxyethylene-polyoxypropylene block copolymers. The examples also include cationic surfactants such as alkylamine salts and quaternary ammonium salts, and silicone-based and fluorine-based surfactants.

The content of the surfactant may be, for example, 0.001% by mass or more and less than 1.0% by mass based on the total mass of the inkjet ink.

1-1-4-4. Polymerization Inhibitor

Examples of the polymerization inhibitor include N-oxyl-based polymerization inhibitors, phenol-based polymerization inhibitors, quinone-based polymerization inhibitors, amine-based polymerization inhibitors, and copper dithiocarbamate-based polymerization inhibitors.

The content of the polymerization inhibitor is, for example, preferably 0.01% by mass or more and 1% by mass or less and more preferably 0.05% by mass or more and 0.5% by mass or less, based on the total mass of the inkjet ink.

1-2. Physical Properties

The viscosity of the inkjet ink at 80° C. is preferably 3 mPa·s or more and 20 mPa·s or less, and more preferably 7 mPa·s or more and 9 mPa·s or less, from the viewpoint of further enhancing the ejection property from the inkjet head.

The inkjet ink preferably undergoes a sol-gel phase transition at a temperature of 40° C. or more and less than 100° C. The gelation temperature of the inkjet ink is preferably 40° C. or more and 70° C. or less. When the gelation temperature of the inkjet ink is 40° C. or more, the ink gels quickly after landing on a recording medium, and therefore the pinning property becomes higher. When the gelation temperature of the ink is 70° C. or lower, the ink is less likely to be gelled at the time of ejection of the inkjet ink from an inkjet head in which the ink temperature is usually about 80° C., and thus the ink can be ejected more stably.

The viscosity at 40° C., the viscosity at 80° C., and the gelation temperature of the inkjet ink can be obtained by measuring a temperature change in the dynamic viscoelasticity of the ink with a rheometer. For example, a stress control type rheometer Physica MCR series, manufactured by Anton Paar Co., Ltd. is used. Specifically, a temperature change curve of viscosity is obtained when the ink is heated to 100° C. and cooled to 25° C. under conditions of a shear rate of 11.7 (1/s) and a temperature lowering rate of 0.1° C./s. Then, the viscosity at 40° C. and the viscosity at 80° C. can be determined by reading the viscosities at 40° C. and 80° C., respectively, in the viscosity-temperature change curve. The gelation temperature can be determined as a temperature at which the viscosity becomes 200 mPa·s in a temperature change curve of viscosity.

1-3. Preparation Method

The inkjet ink can be prepared by mixing the respective components described above. At this time, in order to increase the solubility of each component, it is preferable to mix the components while heating.

Note that a pigment dispersion liquid containing the pigment and the dispersant may be prepared in advance, and the remaining components may be added thereto and mixed. At this time, the pigment can be dispersed with, for example, a ball mill, a sand mill, an attritor, a roll mill, an agitator, a Henschel mixer, a colloid mill, an ultrasonic homogenizer, a pearl mill, a wet-type jet mill, or a paint shaker.

2. Method for Producing Cured Film

The above-described inkjet ink can be used for forming a cured film on the surface or inside of the base material by discharging the ink from an inkjet head to apply the ink to the surface of the base material and then curing the ink by irradiation with actinic radiation.

The method of ejection from the inkjet head may be either an on-demand method or a continuous method. The inkjet head of the on-demand system may be of a single cavity type or a double cavity type. An electromechanical conversion method such as a bender type, a piston type, a share mode type, and a shared wall type may be used. In addition, any of electrothermal conversion systems such as a thermal ink jet type and a bubble jet ("bubble jet" is a registered trademark of Canon Inc.) type may be used.

The type of the base material is not particularly limited. In addition to normal uncoated paper and coated paper, synthetic paper YUPO ("YUPO" is a registered trademark of Yupo Corporation), various plastics used for flexible packaging, and films thereof can be used. Examples of various plastic films include polypropylene (PP) films, polyethylene terephthalate (PET) films, biaxially stretched polystyrene (OPS) films, and biaxially stretched polypropylene (OPP) films. Examples the film include biaxially stretched nylon (ONy) films and polyvinyl chloride (PVC) films. Polyethylene (PE) films, triacetyl cellulose (TAC) films and the like are also included. Examples of other plastics include polycarbonate, (meth)acrylic resin, acrylonitrile-butadiene-styrene copolymer (ABS), polyacetal, polyvinyl alcohol (PVA9), and rubbers.

Note that the inkjet ink ejected from the inkjet head may be applied directly to the base material, or the inkjet ink may be applied to an intermediate transfer member and then transferred from the intermediate transfer member to the base material.

Thereafter, the applied inkjet ink is irradiated with actinic radiation to cure the inkjet ink.

Examples of active energy rays include electron beams, ultraviolet rays, α-rays, γ-rays, X-rays, and the like. Among these, ultraviolet rays and electron beams are preferable, and ultraviolet rays are more preferable. The ultraviolet rays are preferably light having peak wavelengths in a range of 360 nm or more and 410 nm or less. In addition, the ultraviolet rays are preferably emitted from a laser light emitting diode (LED) light source. Since the LED has little radiant heat, the inkjet ink is less likely to dissolve at the time of the irradiation with the actinic radiation, and gloss unevenness or the like due to the dissolution of the ink is less likely to be caused.

When ultraviolet rays are used as the actinic radiation, the amount of light per irradiation is preferably 500 mJ/cm$^2$ or more and 4000 mJ/cm$^2$ or less.

3. Cured Film

A cured film can be formed on the surface of the base material by the method described above. The cured film may be used as various patterned resin films in addition to an image.

Example

Hereinafter, the present invention will be specifically described with reference to Examples, but the scope of the present invention is not limited to the contents of Examples.

1. Preparation of Inkjet Ink (Preparation of Black Pigment Dispersion Liquid)

Placed in a stainless steel beaker were 9 parts by mass of a pigment-dispersing agent (Ajisper PB824, manufactured by Ajinomoto Fine Techno Co., Inc), and 70 parts by mass of a polymerizable compound (A2) (tripropylene glycol diacrylate), and 0.02 parts by mass of a polymerization inhibitor (Irgastab UV10, manufactured by Ciba Japan K. K). The mixture was heated and stirred for 1 hour while being heated with a hot plate at 65° C. After cooling the mixture to room temperature, 21 parts by mass of C. I. Pigment Black 7 (manufactured by Mitsubishi Chemical Corporation) (pigment) was added. The mixed solution was placed in a glass bottle together with 200 g of zirconia beads having a diameter of 0.5 mm, and the glass bottle was tightly stoppered. The mixture was dispersed for 8 hours with a paint shaker. Thereafter, the zirconia beads were removed to obtain a pigment dispersion liquid.

Actinic radiation-curable inkjet ink 1 to inkjet ink 19 were each prepared using the prepared pigment dispersion liquid and the following materials.

(Amine-Modified Polymerizable Compound (A1))

A1-1: EBECRYL80 (Manufactured by Daicel Corporation, number of functional groups: 4, weight average molecular weight: 1000)

A1-2: EBECRYL7100 (Manufactured by Daicel Corporation, number of functional groups: 2, weight average molecular weight: 400)

A1-3: CN371 (manufactured by Sartmer, number of functional groups: 2, weight average molecular weight: 1600)

(Other Polymerizable Compounds (A2))

A2-1: Tripropylene glycol diacrylate (TPGDA)

A2-2: Polyethylene glycol #600 diacrylate (PEGDA)

A2-3: 3PO modified trimethylolpropane triacrylate (3PO-TMPTA)

A2-4: 3EO modified trimethylolpropane triacrylate (3EO-TMPTA)

(Photopolymerization Initiator (B1))

B1-1: Ethoxy(2,4,6-trimethylbenzoyl)phenylphosphine oxide (Omnirad TPO-L (manufactured by IGM Resins)).

(Photopolymerization Initiator (B2))

B2-1: Bis(2,4,6-(trimethylbenzoyl)phenylphosphine oxide (Omnirad 819 (manufactured by IGM Resins Inc)).

B2-2: Diphenyl(2,4,6-trimethylbenzoyl)phenylphosphine oxide (DAROCURE TPO (manufactured by Basf SE)).

(Other Photopolymerization Initiator (B3))

B3-1: SPEEDCURE ITX (manufactured by Lambson)

(Gelling Agent (C))

Distearyl ketone (manufactured by Kao Corporation)

The materials described above were blended in the proportions described in Table 1 to Table 3 and sufficiently mixed with a three roll mill. Thereafter, each mixture was filtered through a polypropylene pleated filter (manufactured by ROKI TECHNO CO., LTD) of 30 μm to obtain Ink 1 to Ink 19.

TABLE 1

| Ink No. | | 1 | 2 | 3 | 4 | 5 | 6 |
|---|---|---|---|---|---|---|---|
| Pigment dispersion liquid | | 14.0 | 14.0 | 14.0 | 14.0 | 14.0 | 14.0 |
| (A1) | A1-1 | 1.0 | 1.0 | 1.0 | 1.0 | 1.0 | 1.0 |
| Amine-modified | A1-2 | | | | | | |
| oligomer | A1-3 | | | | | | |
| (A2) | A2-1 | 20.0 | 20.0 | 20.0 | 20.0 | 20.0 | 20.0 |
| Other | A2-2 | 20.0 | 20.0 | 20.0 | 20.0 | 20.0 | 20.0 |
| polymerizable | A2-3 | 20.0 | 20.0 | 20.0 | 20.0 | 20.0 | 20.0 |
| compound | A2-4 | 20.0 | 19.0 | 18.0 | 17.0 | 16.0 | 11.0 |
| (B1) Initiator | B1-1 | 1.0 | 2.0 | 3.0 | 4.0 | 5.0 | 10.0 |
| (B2) Initiator | B2-1 | | | | | | |
| | B2-2 | | | | | | |
| (B3) Initiator | B3-1 | 1.0 | 1.0 | 1.0 | 1.0 | 1.0 | 1.0 |
| (C) Gelling agent | | 3.0 | 3.0 | 3.0 | 3.0 | 3.0 | 3.0 |
| (A-1)/(B) | | 0.5 | 0.3 | 0.3 | 0.2 | 0.2 | 0.1 |
| (A-1)/(B-1) | | 1.0 | 0.5 | 0.3 | 0.3 | 0.2 | 0.1 |

TABLE 2

| Ink No. | | 7 | 8 | 9 | 10 | 11 | 12 | 13 | 14 | 15 |
|---|---|---|---|---|---|---|---|---|---|---|
| Pigment dispersion liquid | | 14.0 | 14.0 | 14.0 | 14.0 | 14.0 | 14.0 | 14.0 | 14.0 | 14.0 |
| (A1) | A1-1 | 1.0 | 1.0 | | | 0.5 | 3.0 | 5.0 | 10.0 | 1.0 |
| Amine-modified | A1-2 | | | 1.0 | | | | | | |
| oligomer | A1-3 | | | | 1.0 | | | | | |
| (A2) | A2-1 | 20.0 | 20.0 | 20.0 | 20.0 | 20.0 | 20.0 | 20.0 | 20.0 | 20.0 |
| Other | A2-2 | 20.0 | 20.0 | 20.0 | 20.0 | 20.0 | 20.0 | 20.0 | 20.0 | 20.0 |
| polymerizable | A2-3 | 20.0 | 20.0 | 20.0 | 20.0 | 20.0 | 20.0 | 20.0 | 20.0 | 20.0 |
| compound | A2-4 | 15.0 | 15.0 | 15.0 | 15.0 | 15.5 | 13.0 | 11.0 | 6.0 | 17.5 |
| (B1) Initiator | B1-1 | 3.0 | 3.0 | 3.0 | 3.0 | 3.0 | 3.0 | 3.0 | 3.0 | 3.0 |
| (B2) Initiator | B2-1 | 3.0 | | 3.0 | 3.0 | 3.0 | 3.0 | 3.0 | 3.0 | 3.0 |
| | B2-2 | | 3.0 | | | | | | | |

TABLE 2-continued

| Ink No. | | 7 | 8 | 9 | 10 | 11 | 12 | 13 | 14 | 15 |
|---|---|---|---|---|---|---|---|---|---|---|
| (B3) Initiator | B3-1 | 1.0 | 1.0 | 1.0 | 1.0 | 1.0 | 1.0 | 1.0 | 1.0 | 1.0 |
| (C) Gelling agent | | 3.0 | 3.0 | 3.0 | 3.0 | 3.0 | 3.0 | 3.0 | 3.0 | 0.5 |
| (A-1)/(B) | | 0.1 | 0.1 | 0.1 | 0.1 | 0.1 | 0.4 | 0.7 | 1.4 | 0.1 |
| (A-1)/(B-1) | | 0.3 | 0.3 | 0.3 | 0.3 | 0.2 | 1.0 | 1.7 | 3.3 | 0.3 |

TABLE 3

| Ink No. | | 16 | 17 | 18 | 19 |
|---|---|---|---|---|---|
| Pigment dispersion liquid | | 14.0 | 14.0 | 14.0 | 14.0 |
| (A1) | A1-1 | 0.0 | 1.0 | 1.0 | 1.0 |
| Amine-modified | A1-2 | | | | |
| oligomer | A1-3 | | | | |
| (A2) | A2-1 | 20.0 | 20.0 | 20.0 | 20.0 |
| Other polymerizable | A2-2 | 20.0 | 20.0 | 20.0 | 20.0 |
| compound | A2-3 | 20.0 | 20.0 | 20.0 | 20.0 |
| | A2-4 | 16.0 | 18.0 | 18.0 | 18.0 |
| (B1) Initiator | B1-1 | 3.0 | 3.0 | | |
| (B2) Initiator | B2-1 | 3.0 | 3.0 | 3.0 | |
| | B2-2 | | | | 3.0 |
| (B3) Initiator | B3-1 | 1.0 | 1.0 | 1.0 | 1.0 |
| (C) Gelling agent | | 3.0 | | 3.0 | 3.0 |
| (A-1)/(B) | | 0.0 | 0.1 | 0.3 | 0.3 |
| (A-1)/(B-1) | | 0.0 | 0.3 | — | — |

2 Evaluation

The prepared Ink 1 to Ink 19 were evaluated as follows.

2-1. Folding Crack Resistance

A solid image of 4 cm×4 cm/m$^2$ having an applied amount of 9 g was allowed to stand under an environment of 25° C. and 60% RH for 24 hours, and then the image was folded in two in the longitudinal direction so that the surface on which the solid image was formed became a mountain and a fold was formed in the solid image of each color, and the degree of cracking of the image was evaluated.

A: No cracks are found, or substantially no cracks are found

B: Partially cracked

C: Long cracks are observed

D: There are substantially no uncracked portions 2-2. Cut Surface Peeling

A solid image formed on a recording medium (OK Top Coat) was cut by press cutting, Nichiban Cellotape® was attached to the cut surface, and then the tape was peeled off after reciprocating while applying a load with a finger from above, and the degree of peeling was visually evaluated.

A: Adhesion of a peeled portion is not recognized on the tape side, or adhesion of a peeled portion only of the cut surface is observed on the tape side B: Peeling in the vicinity of the cut surface is slightly observed on the image surface C: On the image surface, peeling is observed from the vicinity of the cut surface to a place distant from the cut surface D: The majority of the taped portions peels off 2-3. Nail Rubbing The surface of the solid image formed on a recording medium (OK Top Coat) was rubbed with a pseudo nail (molded acrylic piece) for 30 seconds while a load of 250 g was applied, and the degree of peeling was visually evaluated.

A: No peeling is observed

B: A small portion may be peeled off

C: Although some portions peeled off, most of the rubbed portion remains

D: Almost all of the rubbed portions are peeled off 2-4. Paper Surface Rubbing

The degree of transfer to paper, when a load of 500 g/cm$^2$ was applied to the surface of the solid image formed on a recording media (OK Top Coat), and reciprocated 30 times, was visually evaluated.

A: No color transfer or almost no color transfer is observed

B: Faint color transfer can be observed in some portions

C: Color transfer can be observed visually

D: It can be clearly visually observed that the color has transferred to the entirety of the rubbed paper 2-5. Glossiness With respect to the density gradation tone patch images having changed dot ratios of 20%, 50%, 70%, and 100% in formed portions having the area of 2 cm×2 cm, the glossiness and the difference in glossiness between the formed image portion and the non-printed portion (white background portion) were visually observed and the evaluation of the gloss evenness was performed according to the following criteria.

A: No glossiness difference between the density gradation patch image and the non-printed portion of the recording medium is observed in the images of all the dot ratios B: Substantially no glossiness difference between the density gradation patch image and the non-printed portion of the recording medium is observed in the images of all the dot ratios C: In the images of some dot ratios, a slight difference in glossiness between the density gradation patch image and the non-printed portion of the recording medium is observed, but the quality is within a practically acceptable range D: In the images of all the dot ratios, the difference in glossiness between the density gradation patch image and the non-printed portion of the recording medium is observed, and the image is an image having a sense of incongruity or an image which cannot withstand practical use 2-6. Blooming The 5 cm×5 cm solid image formed on a recording media (OK top coat) was stored under an environment of 40° C. for 1 month. The stored image was visually observed, and blooming was evaluated according to the following criteria.

A: No precipitate is observed on the image surface

B: Substantially no precipitate is observed on the surface of the image

C: A thin precipitate is present on the surface of the image and can be visually observed D: The image surface is covered with a powdery substance, which can be clearly observed visually The evaluation results are shown in Tables 4 to 6.

TABLE 4

| | Example | Example | Example | Example | Example | Example |
|---|---|---|---|---|---|---|
| | Ink No. | | | | | |
| Remarks | 1 | 2 | 3 | 4 | 5 | 6 |
| Folding crack | B | A | A | A | A | A |
| Cut surface peeling | C | C | C | B | B | B |
| Nail rubbing | C | C | B | B | B | A |
| Paper surface rubbing | B | B | B | B | B | B |
| Glossiness | B | B | B | B | A | A |
| Blooming | B | B | A | A | A | A |

TABLE 5

| | Example | Example | Example | Example | Example | Example | Example | Example | Example |
|---|---|---|---|---|---|---|---|---|---|
| | Ink No. | | | | | | | | |
| Remarks | 7 | 8 | 9 | 10 | 11 | 12 | 13 | 14 | 15 |
| Folding crack | A | A | A | A | A | A | B | B | B |
| Cut surface peeling | A | A | A | A | A | A | A | A | A |
| Nail rubbing | A | A | A | A | B | A | A | A | A |
| Paper surface rubbing | A | A | A | A | A | A | A | A | B |
| Glossiness | A | A | A | A | A | A | A | A | B |
| Blooming | A | A | A | A | A | A | A | B | C |

TABLE 6

| | Comparative example | Comparative example | Comparative example | Comparative example |
|---|---|---|---|---|
| | Ink No. | | | |
| Remarks | 16 | 17 | 18 | 19 |
| Folding crack | A | C | D | D |
| Cut surface peeling | B | C | B | B |
| Nail rubbing | D | C | B | B |
| Paper surface rubbing | C | C | B | B |
| Glossiness | A | D | A | A |
| Blooming | A | D | A | A |

As illustrated in Table 4 to Table 6, Ink 1 to Ink 15 containing the amine-modified polymerizable compound (A1), the photopolymerization initiator (B1), which is ethoxy(2,4,6-trimethylbenzoyl)phenylphosphine oxide, and the gelling agent (C) had high abrasion resistance and the cured films thereof had improved crack resistance.

INDUSTRIAL APPLICABILITY

According to the present invention, a cured product having both high abrasion resistance and high folding crack resistance can be produced.

Although embodiments of the present invention have been described and illustrated in detail, the disclosed embodiments are made for purposes of illustration and example only and not limitation. The scope of the present invention should be interpreted by terms of the appended claims.

What is claimed is:

1. An actinic radiation-curable inkjet ink, comprising:

a polymerizable compound (A) that polymerizes upon irradiation with actinic radiation; a photopolymerization initiator (B); and a gelling agent (C), wherein the polymerizable compound (A) contains an amine-modified polymerizable compound (A1), the photopolymerization initiator (B) contains ethoxy(2,4,6-(trimethylbenzoyl)phenylphosphine oxide, a content of the amine-modified polymerizable compound (A1) is more than 0% by mass and 3% by mass or less based on a total mass of the inkjet ink, and a content of the ethoxy(2,4,6-(trimethylbenzoyl)phenylphosphine oxide is 0.5% by mass or more and 6% by mass or less based on the total mass of the inkjet ink.

2. The actinic radiation-curable inkjet ink according to claim 1, wherein a content of the photopolymerization initiator (B) is 3% by mass or more and 10% by mass or less based on the total mass of the inkjet ink.

3. The actinic radiation-curable inkjet ink according to claim 1, wherein the content of the amine-modified polymerizable compound (A1) is 0.01% by mass or more and 2% by mass or less based on the total mass of the inkjet ink.

4. The actinic radiation-curable inkjet ink according to claim 1, wherein a ratio of the content of the amine-modified polymerizable compound (A1) to a content of the photopolymerization initiator (B) is more than 0 and 8 or less, the ratio being a ratio (A1/B).

5. The actinic radiation-curable inkjet ink according to claim 1, wherein a ratio of the content of the amine-modified polymerizable compound (A1) to a content of the photopolymerization initiator (B) is more than 0 and 2 or less, the ratio being a ratio (A1/B).

6. The actinic radiation-curable inkjet ink according to claim 1, wherein a content of the gelling agent (C) is 0.5% by mass or more and 10% by mass or less based on the total mass of the inkjet ink.

7. The actinic radiation-curable inkjet ink according to claim 1, wherein the photopolymerization initiator (B) contains bis(2,4,6-(trimethylbenzoyl)phenylphosphine oxide or diphenyl (2,4,6-(trimethylbenzoyl)phenylphosphine oxide.

8. A method for producing a cured film, the method comprising:

applying the inkjet ink according to claim 1 to a base material; and irradiating the applied inkjet ink with actinic radiation.

9. The actinic radiation-curable inkjet ink according to claim 1, wherein the photopolymerization initiator (B) further contains bis(2,4,6-(trimethylbenzoyl)phenylphosphine oxide, and a content of the bis(2,4,6-(trimethylbenzoyl)phenylphosphine oxide is 3% by mass or more and 8% by mass or less based on the total mass of the inkjet ink.

* * * * *